Figure 1:
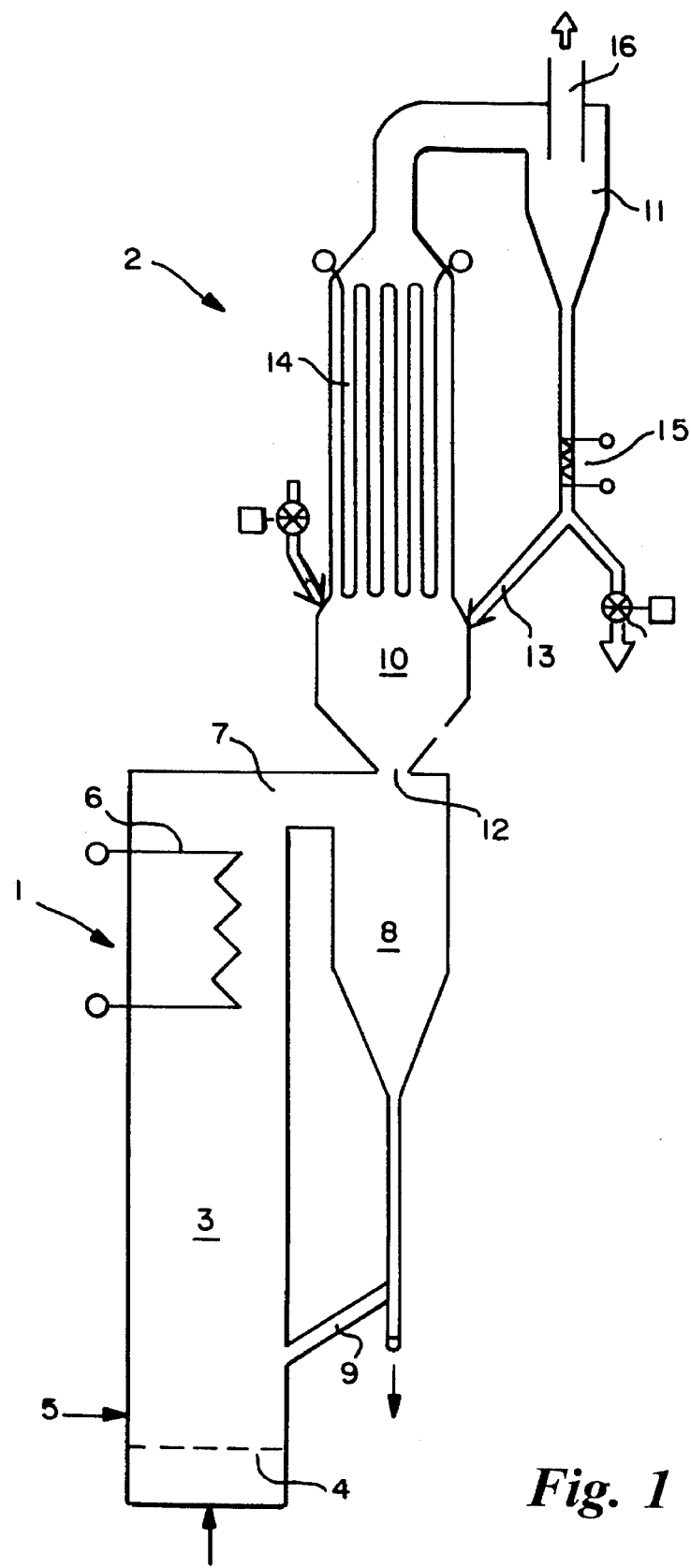

United States Patent [19]

Hiltunen et al.

[11] Patent Number: 5,481,063
[45] Date of Patent: Jan. 2, 1996

[54] TREATMENT OF PROCESS GASES CONTAINING HALOGENOUS COMPOUNDS

[75] Inventors: Matti Hiltunen, Karhula; Harry Lampenius; Kurt Westerlund, both of Helsinki, all of Finland

[73] Assignee: A. Ahlstrom Corporation, Karhula, Finland

[21] Appl. No.: 776,403

[22] PCT Filed: May 16, 1990

[86] PCT No.: PCT/FI90/00134

§ 371 Date: Nov. 22, 1991

§ 102(e) Date: Nov. 22, 1991

[87] PCT Pub. No.: WO90/14559

PCT Pub. Date: Nov. 29, 1990

[30] Foreign Application Priority Data

May 18, 1989 [FI] Finland ................................. 892381
Jul. 3, 1989 [FI] Finland ................................. 893225

[51] Int. Cl.⁶ .................................. F23B 7/00; C01B 7/00
[52] U.S. Cl. .................. 588/205; 423/240 S; 588/206; 110/342
[58] Field of Search ........................ 110/342, 215, 110/216; 423/511, 240 S; 75/654; 588/26, 205, 206

[56] References Cited

U.S. PATENT DOCUMENTS

| | | | |
|---|---|---|---|
| 3,831,535 | 8/1974 | Baardson | 110/216 |
| 4,087,497 | 5/1978 | Optiz et al. | 261/118 |
| 4,215,095 | 7/1980 | Harris et al. | 423/240 |
| 4,651,655 | 3/1987 | Kunzel | 110/215 |
| 4,726,302 | 2/1988 | Hein et al. | 110/215 |
| 4,762,074 | 8/1988 | Sorensen | 110/215 |
| 4,788,918 | 12/1988 | Keller | 110/216 |
| 4,844,875 | 7/1989 | Ettehadieh | 423/210 |
| 4,860,671 | 8/1989 | Glorioso | 110/215 |
| 4,909,161 | 3/1990 | Germain | 110/216 |
| 4,932,334 | 6/1990 | Patte et al. | 110/216 |
| 4,958,578 | 9/1990 | Houser | 110/216 |
| 5,086,715 | 2/1992 | Burgin et al. | 110/215 |

*Primary Examiner*—Noah P. Kamen
*Attorney, Agent, or Firm*—Nixon & Vanderhye

[57] ABSTRACT

The present invention relates to a method of treating various chlorine-containing materials such as wastes, biological sludges and even metal concentrates in a circulating fluidized bed reactor (1) or a grate furnace at a high temperature of over 830° C. and of cooling the resultant process gases for minimizing the amount of polyhalogenated aromatic compounds in the process gases. The process gases are cooled to a temperature below 250° C. at a cooling velocity exceeding 1000° C. per second. Cooling is preferably effected in a circulating fluidized bed reactor (2).

18 Claims, 2 Drawing Sheets

TREATMENT OF PROCESS GASES CONTAINING HALOGENOUS COMPOUNDS

The present invention relates to a method of treating various materials such as wastes, biological sludges and even metal oxide concentrates, which materials contain halogenated hydrocarbon compounds, at a high temperature, and of cooling the resultant process gases for minimizing the amount of polyhalogen compounds harmful to the environment, such as dioxins and furans, in the emissions of combustion processes.

The chlorine-containing environmental poisons resulting from the combustion of municipal waste and also from the combustion of biological sludges and from smelting processes have been recognized as constituting a problem. It has been found that polychlorinated aromatic compounds categorized as superpoisons, such as coplanar PCB, polychlorinated dioxins and polychlorinated furans, are produced to a great extent in both municipal waste incinerator plants and industrial combustion plants for biological waste. Dioxins have also been found in flue gases from metal smelteries. These chlorine-containing compounds are superpoisonous for human beings and animals; they bring about genetic damages and obviously cause also cancer. Toxic compounds spread in the environment mostly bound to flue dust.

It has been found that the lower the temperature and the shorter the residence time, the greater amount of superpoisons results. Combustion at 500°–700° C. has been established to be especially favourable for the formation of polychlorinated dioxins and furans. This has led to the conclusion that the combustion should be carried out at a higher temperature and with a longer residence time in order to decompose the superpoisons. On the other hand, it has also been suggested that the wastes could be safely destroyed by incinerating them at relatively low temperatures if the flue gases are post-combusted at such a high temperature that, for example, dioxin and furan toxins decompose.

Recently, it has been found that heavy metals are of great significance in the formation of dioxins in the combustion. Heavy metals catalyze, for example, the production of dioxins. Dioxins are formed by synthetization from chlorine compounds in the presence of coal, water and oxygen at favourable temperatures, for example, in flue gases. It has been established that a great portion of the dioxins of fly ash is formed only after the combustion by means of a so-called "de novo synthesis" in the heat exchangers and the stack because the "de novo synthesis" of the dioxins is to a great extent dependent on the temperature, and the temperature of 250° to 400° C. is especially suitable for this synthesis. Efforts have been made, by an as complete as possible combustion, by a high combustion temperature and a long residence time, to produce fly ash containing as little carbon as possible, whereby the synthesis would be prevented. By separating metals from the wastes, it has also been attempted to decrease the amount of polychlorinated aromats in the flue gases.

U.S. Pat. No. 4,762,074 suggests the combustion of wastes containing pre-stages of toxic dioxins and furans by means of oxygenated air at a high at least 1200° C. temperature for destroying the toxins. By using highly excessive amount of oxygen, it is also attempted to maintain the amount of those nitrogen oxides, which increase at high temperatures, at an acceptable level. Swedish patent specification 453 777 discloses a method of combusting solid waste in a reactor in a bubbling fluidized bed at a temperature below 900° C. In the reactor, above the actual fluidized bed, the temperature of the flue gases is raised at least to 950° C. by adding secondary air and insulating the reactor walls. The temperature of the flue gases is maintained at the level above 950° C. for as long as required for the hydrocarbons and dioxins to become decomposed, by conducting the flue gases through an uncooled gas duct. The gases are cooled prior to the heat exchangers by injecting air or flue gases into the gases.

U.S. Pat. No. 4,794,871 discloses a method comprising two or three stages, where the waste is first treated in a rotary drum at a temperature of at most 50° C. and the solid waste formed thereby is then treated at a temperature of at least 500° C., preferably at 500° to 1000° C., for destroying toxic substances. The flue gases from both stages are combined and combusted at such a high temperature that the toxic compounds of the gases are completely destroyed.

Swedish patent application 8406090-4 discloses a method in which wastes harmful to the environment and containing chlorinated hydrocarbons are incinerated substoichiometrically at a temperature of at least 1200° C. The combustion is effected as plasma incineration. According to that patent application, new formation of toxic compounds is prevented by bringing the flue gases that have been cooled to a temperature of 350° to 700° C., into contact with lime for separating chlorine from the gases. Chlorine separation is preferably effected by conducting the gases through a vertical reactor filled with lime. At low temperatures, however, polychlorinated aromats are produced quickly until the chlorine has become bound to lime. Thus the method does not lead to a desirable result.

U.S. Pat. 4,215,095 discloses a method of treating various materials such as wastes, biological sludges or metal oxide concentrates, which materials contain halogenated hydrocarbon compounds, at a high temperature and of cooling resultant process gases for minimizing the amount of polyhalogenated compounds harmful to the environment, such as dioxins and furans, in the emissions of the combustion processes. The exhaust gases are introduced into a quench zone which is cooled by aqueous hydrochloric acid spray. This is a very exotic way of cooling flue gases.

An object of the present invention is to provide a simple method of minimizing the emissions of polyhalogenated hydrocarbon compounds in the treatment or combustion of wastes and other solid materials.

The most important object of the invention is to provide a method for preventing the new formation of polyhalogenated derivatives in the process gases from the combustion processes, which method contributes to minimizing the emissions of dioxins and furans.

A still further object of the invention is to provide a method which minimizes the emissions of dioxins and furans without separate post-combustion.

In a method of the invention
- the materials to be treated are first heated or combusted in the presence of gas containing oxygen in a circulating fluidized bed boiler at 830°–1000° C. for combusting the material and for decomposing polyhalogenated compounds present in the material,
- the process gases thereby resulting are cooled with a cooling velocity of at least 300° C. per second past the temperature range of 250° to 400° C. in a circulating fluidized bed reactor.

In another method of the invention
- the materials to be treated are first heated or combusted in the presence of gas containing oxygen in a conventional combustion chamber at a temperature exceeding 1000° C. for combusting the material and for decomposing polyhalogenated compounds present in the material, the process gases thereby resulting are cooled with a cooling velocity of at least 300° C. per second past the temperature range of 250° to 400° C. in a circulating fluidized bed reactor.

The material to be treated is thereby first heated in such a manner that the halogenated hydrocarbon compounds which may be contained in the materials and which are harmful to the environment decompose. The resultant process gases are quickly cooled past the temperature range of 250° to 400° C., which temperature range is favourable to the new formation of halogenated hydrocarbons; i.e. the gases are cooled to a temperature below 250° C., whereby the synthetization of the compounds harmful to the environment, such as polychlorinebiphenol, dioxins and furans, from the chlorine-containing compounds is avoided. The cooling velocity is preferably over 1000° C./s.

According to an arrangement according to the invention, the municipal waste or biological sludges from the industry are favourably combusted in a circulating fluidized bed reactor at 83° to 1000° C., whereby the above-mentioned superpoisons contained in the wastes or sludges mainly decompose. The flue gases are quickly cooled to a temperature below 250° C., preferably below. 200° C. The cooling is effected in a circulating fluidized bed reactor, in which a very fast cooling, faster than 300° C./s, even faster than 2000° C./s, is brought about. Thus, the flue gases are cooled practically at once to a temperature below 250° C. Fast cooling to a temperature below the temperature level of 250°–600° C. which temperature level is favourable, for example, for the dioxin synthesis minimizes the production of polyhalogenated aromatic compounds. It is possible to add such materials into the circulating fluidized bed mass that either react with the chlorine, flour or sulphur compounds contained in the flue gases or absorb these compounds, for eliminating said compounds from the gases. Simultaneously, a significant portion of heavy metals contained in the flue gases, melting and evaporating at low temperatures, such as Hg, As, Zn, Cd, Pb and Sn, and their compounds, may be separated by condensing them to the circulating mass in a cooling reactor. Particles may be removed either continuously or intermittently from the circulation of the cooling reactor, for discharging harmful or recoverable materials. Correspondingly, new particles are added for maintaining a circulating mass of particles.

According to a second arrangement according to the invention, for example, in combustion processes in which unsorted wastes harmful to the environment are combusted in grate furnaces and the resultant process gases are first heated for at least 1 to 2 seconds at a temperature higher than 1000° C. for decomposing hazardous chlorinated hydrocarbons, process gases may thereafter be cooled in such a manner that the cooling rate at the critical temperature range of 250° to 400° C. is high, higher than 300° C./s, preferably higher than 1000° C./s. The flue gases can be cooled either immediately from the furnace temperature to a temperature below 250° C. or gradually so as to first cool the gases near the critical temperature and thereafter quickly past the critical temperature range.

Fast cooling of the flue gases is effected in a circulating fluidized bed reactor. Prior to introduction of the flue gases into the fluidized bed reactor, they may be cooled to 400°–600° C. in an ordinary waste heat boiler for recovering heat. Lime or other reagent may be added in the fluidized bed reactor in which the fast cooling is accomplished, in order to bind impurities of the flue gases.

Precooling of the gases may also be effected in another circulating fluidized bed reactor disposed next to the furnace. In this first fluidized bed reactor, the sulphur contained in the gases may be reduced at a higher temperature than in the final cooling reactor.

Cooling of the gases containing heavy metals may be so arranged as to separate the heavy metals at a suitable temperature in the first fluidized bed reactor and in this case, the sulphur is separated in the second cooling reactor, whereby both the metals and the sulphur are separately recovered.

According to the invention, the flue gases are cooled preferably to a temperature below 200° C., for example, to 280° C., whereby the gases may be conducted to a bag filter for final cleaning.

Figure 2:
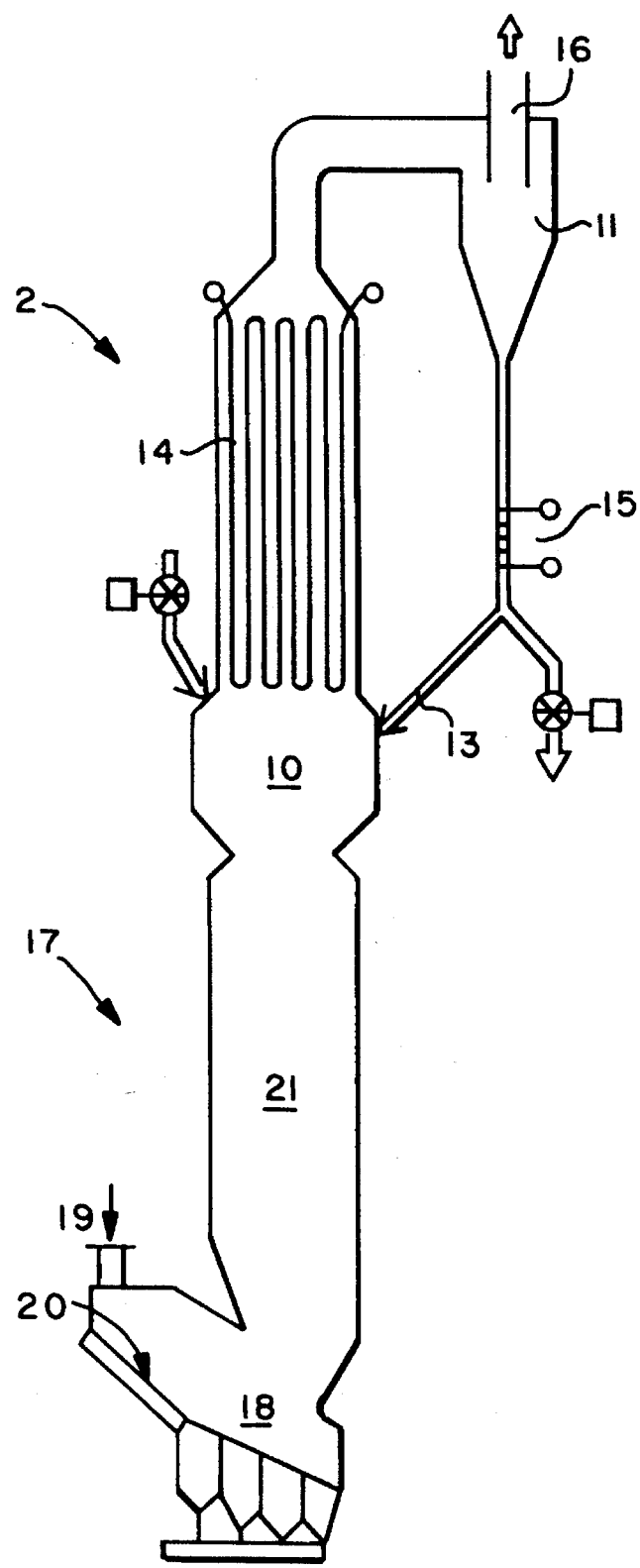

The invention is further described below, by way of example, with reference to the accompanying schematic drawings, in which FIG. 1 is a schematic illustration of an apparatus for carrying out the method of the invention, and FIG. 2 is a schematic illustration of a second apparatus for carrying out the method of the invention.

FIG. 1 illustrates an apparatus which comprises a first circulating fluidized bed reactor 1 for combusting wastes and a second circulating fluidized bed reactor 2 disposed thereafter for fast cooling of flue gases. The first fluidized bed reactor comprises a combustion chamber 3 with a bottom plate 4 disposed in the bottom part thereof for introducing cooling air into the reactor. The waste material is fed into the combustion chamber by members 5 arranged in the wall of the combustion chamber. The walls of the upper part of the combustion chamber may be membrane walls in order to recover the heat from the combustion chamber. For heat recovery, the combustion chamber may also be provided with heat transfer means 6.

The flue gases are conducted via an opening 7 into a cyclone separator 8, in which solid particles are separated from the flue gases. The particles are returned via a duct 9 into the lower part of the combustion chamber. By means of fluidizing air, an intensive, upwardly directed gas flow is maintained in the combustion chamber, a portion of the bed material i.e. circulating fluidized bed mass being entrained with the flow from the fluidized bed to the upper part of the combustion chamber and further via opening 7 into a particle separator. The major part of the solid material is returned from the particle separator into the lower part of the combustion chamber. By means of the circulating mass, the temperature is equalized and remains almost unchanged all over the circulating system.

In a reactor operating by means of a circulating mass, the waste fed into the reactor instantly mixes with a great amount of bed material and very soon reaches the temperature prevailing in the reactor, not substantially lowering said temperature. In the circulating fluidized bed reactor, the combustion process continues throughout the entire circulating system, whereby a long residence time is provided for the combustion. Therefore, it is safe to incinerate waste in a reactor at lower temperatures than, for example, in grate furnaces, where complete combustion has to be ensured by means of a high temperature.

The hot flue gases are conducted from the cyclone separator to the second circulating fluidized bed reactor, which comprises a mixing chamber 10 and a particle separator 11. The lower part of the mixing chamber is provided with a gas inlet 12, through which the hot gas, also serving as fluidizing gas in a reactor, flows into the mixing chamber. The mixing chamber is also provided with a return duct 13 through which cooled solid particles are introduced into the mixing chamber. Cold particles are introduced into the mixing chamber to such an extent that they, by means of their great amount, quickly cool the flue gases to a temperature below the critical synthesizing temperature of the chlorine-containing compounds.

An extension of the upper part of the mixing chamber serves as a cooling section 14, in which the gases and solid particles are cooled together prior to separation of the particles from the gases. The particles may also be favourably cooled in a separate particle cooler 15 disposed after the particle separator. The flue gases are discharged from the reactor via a duct 16.

The mixing chamber may be of a cooled construction, whereby heat is recovered already in the mixing chamber. If the gases are sufficiently cooled already in the mixing chamber, the amount of heat transfer surfaces may be decreased or possibly they can be left out altogether. In this case the object of cooling section 14 is only to increase the flow rate of the gases and to conduct the gases to the particle separator.

FIG. 2 illustrates a circulating fluidized bed reactor 2 cooling flue gases and being disposed next to a waste incineration furnace 17. The waste material is introduced into a combustion chamber 18 of the furnace via an inlet 19. The waste flows along a grate 20 to the lower part of the combustion chamber and burns therein. Air is supplied through the grate into the combustion chamber. The flue gases rise upwardly in an uptake shaft 21. Additional burners may be disposed in the uptake shaft for ensuring complete combustion and decomposition of materials harmful to the environment.

It is not an intention to limit the invention to the above-described examples, but various modifications of it are possible within the inventive scope defined in the accompanying claims. The upper part of the uptake shaft is provided with a cooling fluidized bed reactor 2, which is capable of quickly cooling the flue gases past the critical temperature level of 250°–400° C. to a temperature below that level.

We claim:

1. A method of treating heterogeneous combustible material which contains halogenated hydrocarbon compounds, comprising the steps of:
   (a) combusting the material under conditions and at a temperature sufficient to decompose polyhalogenated compounds in the material, producing flue gases containing compounds capable of forming dioxins and furans; and
   (b) rapidly cooling the flue gases through the temperature range of 250°–400° C., to below 250° C., to prevent the formation of dioxins and furans in the flue gases.

2. A method as recited in claim 1 wherein step (a) is practiced in a combustion chamber at a temperature in excess of 1000° C.; and comprising the further step, between steps (a) and (b), of cooling the flue gases to a temperature near but above 400° C.

3. A method as recited in claim 1 wherein step (b) is practiced to effect cooling at the rate of greater than 300° C. per second.

4. A method as recited in claim 1 wherein step (b) is practiced in a circulating fluidized bed reactor.

5. A method as recited in claim 1 wherein step (a) is practiced in a first circulating fluidized bed reactor at a temperature of about 830°–1000° C.

6. A method as recited in claim 5 wherein step (b) is practiced in a second circulating fluidized bed reactor.

7. A process for incinerating heterogeneous combustible material in a furnace, the flue gases formed in the incineration of the material being discharged from the combustion chamber of the furnace and being cooled, comprising the steps of:

cooling the flue gases in a first cooling stage, in particular with heat recovery from the flue gases, from their exit temperature from the combustion chamber of 1000° C. or more, to a temperature of near but above 400° C., and then rapidly cooling the flue gases to a temperature below 250° C., to avoid substantially the formation of toxic dioxins and furans in the flue gases.

8. A method of treating wastes, biological sludges, or metal oxide concentrates containing halogenated hydrocarbon compounds at high temperature to minimize the amount of polyhalogenated compounds harmful to the environment, comprising the steps of:
   (a) heating or combusting wastes, biological sludges, or metal oxide concentrates containing halogenated hydrocarbon compounds in a circulating fluidized bed boiler at 830°–1000° C. in the presence of a gas containing oxygen to decompose polyhalogenated compounds to produce process gases; and then
   (b) cooling the process gases from step (a) in a fluidized bed reactor with a cooling velocity of at least 300° C. per second through the temperature range of 250°–400° C. to below 250° C., to produce cooled process gases.

9. A method as recited in claim 8 wherein step (b) is practiced at least in part by separating particles from the cooled process gases, cooling the separated particles, and returning the cooled particles to the fluidized bed reactor.

10. A method as recited in claim 8 wherein step (b) is practiced at least in part by cooling particles in the cooled process gases with a heat transfer device, separating the cooled particles from the process gases, and returning the cooled separated particles to the fluidized bed reactor.

11. A method as recited in claim 8 comprising the further step (c), between steps (a) and (b), of cooling the process gases from step (a) in a waste heat boiler or a second circulating fluidized bed reactor to a temperature of about 400°–600° C.

12. A method as recited in claim 8 wherein step (a) is practiced by treating metal oxides in the presence of carbonaceous materials and oxygen containing gases at a temperature of about 830° C.

13. A method as recited in claim 11 wherein the circulating fluidized bed reactor of step (b) is a first circulating fluidized bed reactor, and wherein step (c) is practiced in a second fluidized bed reactor; and comprising the further step of recovering sulphur compounds in the first fluidized bed reactor by adding sulphur absorbing material to the first fluidized bed reactor.

14. A method as recited in claim 11 wherein the circulating fluidized bed reactor of step (b) is a first circulating fluidized bed reactor, and wherein step (c) is practiced in a second fluidized bed reactor; and comprising the further steps of recovering sulphur compounds in the second fluidized bed reactor, and heavy metals are recovered in the first fluidized bed reactor.

15. A method of treating wastes, biological sludges, or metal oxide concentrates containing halogenated hydrocarbon compounds at high temperature to minimize the amount of polyhalogenated compounds harmful to the environment, comprising the steps of:
   (a) heating or combusting wastes, biological sludges, or metal oxide concentrates containing halogenated hydrocarbon compounds in a conventional combustion chamber at a temperature exceeding 1000° C. in the presence of a gas containing oxygen to decompose polyhalogenated compounds to produce process gases; and then (b) cooling the process gases from step (a) in a fluidized bed reactor with a cooling velocity of at least 300° C. per second through the temperature range of 250°–200° C. to below 250° C., to produce cooled process gases.

16. A method as recited in claim 15 wherein step (b) is practiced at least in part by separating particles from the cooled process gases, cooling the separated particles, and returning the cooled particles to the fluidized bed reactor.

17. A method as recited in claim 15 wherein step (b) is practiced at least in part by cooling particles in the cooled process gases with a heat transfer device, separating the cooled particles from the process gases, and returning the cooled separated particles to the fluidized bed reactor.

18. A method as recited in claim 15 comprising the further step (c), between steps (a) and (b), of cooling the process gases from step (a) in a waste heat boiler or a second circulating fluidized bed reactor to a temperature of about 400°–600° C.

* * * * *